United States Patent
Burge

(10) Patent No.: US 11,047,313 B2
(45) Date of Patent: Jun. 29, 2021

(54) SYSTEM AND METHOD FOR SELECTIVELY MODULATING THE FLOW OF BLEED AIR USED FOR HIGH PRESSURE TURBINE STAGE COOLING IN A POWER TURBINE ENGINE

(71) Applicant: Bell Helicopter Textron Inc., Fort Worth, TX (US)

(72) Inventor: Karl R. Burge, Hurst, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 159 days.

(21) Appl. No.: 16/215,180

(22) Filed: Dec. 10, 2018

(65) Prior Publication Data

US 2020/0182162 A1 Jun. 11, 2020

(51) Int. Cl.
*F02C 9/18* (2006.01)
*F01D 17/04* (2006.01)
(Continued)

(52) U.S. Cl.
CPC ............... *F02C 9/18* (2013.01); *B64D 33/08* (2013.01); *B64F 5/60* (2017.01); *F01D 17/04* (2013.01);
(Continued)

(58) Field of Classification Search
CPC .... F02C 9/18; F02C 6/08; F01D 17/04; F01D 17/06; F01D 17/85; F01D 25/12;
(Continued)

(56) References Cited

U.S. PATENT DOCUMENTS 8,467,949 B2 6/2013 Kim
8,825,342 B2 9/2014 Schaeffer et al.
(Continued)

FOREIGN PATENT DOCUMENTS

EP 2119892 A2 11/2009
EP 2119892 A3 11/2017
(Continued)

OTHER PUBLICATIONS

Bleed Air: Turbine Engines—A Closer Look; https://www.youtube.com/watch?v=L4CT6qCNW8A; Nov. 30, 2013.
(Continued)

*Primary Examiner* — Steven M Sutherland
*Assistant Examiner* — Rodolphe Andre Chabreyrie
(74) *Attorney, Agent, or Firm* — Timmer Law Group, PLLC

(57) ABSTRACT

A method for selectively modulating bleed air used for cooling a downstream turbine section in a gas turbine engine. The method including: measuring an engine and/or aircraft performance parameter by an engine sensor device; comparing the engine and/or aircraft performance parameter to a performance threshold; determining a bleed trigger condition, if the engine and/or aircraft performance parameter crosses the performance threshold; determining a non-cooling condition, if the engine and/or aircraft performance parameter is below the performance threshold; actuating a flow control valve to an open position, in response to the bleed trigger condition, so that bleed air is extracted from the compressor section and flowed to the downstream turbine section; and terminating, in response to the non-cooling condition, the flow of the bleed air to the downstream turbine section of the engine by actuating the flow control valve to a closed position.

4 Claims, 9 Drawing Sheets

(51) Int. Cl.
| | |
|---|---|
| *F01D 17/06* | (2006.01) |
| *F01D 17/08* | (2006.01) |
| *F02C 6/08* | (2006.01) |
| *B64F 5/60* | (2017.01) |
| *B64D 33/08* | (2006.01) |
| *F01D 25/12* | (2006.01) |
| *F02C 7/141* | (2006.01) |
| *F02C 7/18* | (2006.01) |

(52) U.S. Cl.
CPC ........... *F01D 17/06* (2013.01); *F01D 17/085* (2013.01); *F01D 25/12* (2013.01); *F02C 6/08* (2013.01); *F02C 7/141* (2013.01); *F02C 7/18* (2013.01); *F05D 2220/323* (2013.01); *F05D 2220/3212* (2013.01); *F05D 2260/20* (2013.01); *F05D 2260/232* (2013.01); *F05D 2270/05* (2013.01); *F05D 2270/303* (2013.01); *F05D 2270/304* (2013.01); *F05D 2270/313* (2013.01); *F05D 2270/335* (2013.01); *F05D 2270/42* (2013.01)

(58) Field of Classification Search
CPC ......... F05D 2270/303; F05D 2270/304; F05D 2270/313; F05D 2270/335
See application file for complete search history.

(56) References Cited

U.S. PATENT DOCUMENTS

| | | | | |
|---|---|---|---|---|
| 8,862,364 | B2 | 10/2014 | Kim | |
| 9,255,492 | B2* | 2/2016 | Bacic | F02C 3/13 |
| 9,429,078 | B1 | 8/2016 | Crowe et al. | |
| 9,482,236 | B2* | 11/2016 | Khalid | F04D 27/0246 |
| 2010/0290889 | A1* | 11/2010 | Fedor | F01D 11/04 |
| | | | | 415/47 |
| 2011/0138818 | A1* | 6/2011 | Mizukami | F01D 21/00 |
| | | | | 60/778 |
| 2013/0247584 | A1* | 9/2013 | Kasibhotla | F01D 25/12 |
| | | | | 60/782 |
| 2015/0361890 | A1* | 12/2015 | Suciu | F02C 9/18 |
| | | | | 60/785 |
| 2016/0326878 | A1* | 11/2016 | Morimoto | F02C 7/18 |
| 2016/0376981 | A1 | 12/2016 | Ullyott et al. | |
| 2017/0030268 | A1* | 2/2017 | Studerus | F02C 7/26 |
| 2017/0234224 | A1* | 8/2017 | Adibhatla | F02C 7/12 |
| | | | | 60/226.1 |
| 2018/0010520 | A1* | 1/2018 | Iwasaki | F01D 25/12 |
| 2018/0025557 | A1 | 1/2018 | Steinhert | |
| 2018/0045054 | A1 | 2/2018 | Sehra et al. | |
| 2018/0258785 | A1* | 9/2018 | Schelfaut | B64D 27/10 |
| 2019/0063327 | A1* | 2/2019 | Sekiguchi | F02C 7/26 |

FOREIGN PATENT DOCUMENTS

| | | |
|---|---|---|
| EP | 3667044 A1 | 6/2020 |
| JP | 5595232 B2 | 9/2014 |

OTHER PUBLICATIONS

Krampf; A Practical Guide for Gas Turbine Performance Field and Test Data Analysis; The American Society of Mechanical Engineers; 92-GT-427; presented Jun. 1-4, 1992.

EP Search Report, dated Aug. 2, 2019, by the EPO, re EP Patent App No. 19155822.0.

EP Exam Report, dated Aug. 22, 2019, by the EPO, re EP Patent App No. 19155822.0.

EP Examination Report, dated Apr. 21, 2020, by the EPO, re EP Patent App No. 19155822.0.

Communication under Rule 71(3) EPC—Intent to Grant, dated Feb. 11, 2021, by the EPO, re EP Application No. 19155822.0.

* cited by examiner

SYSTEM AND METHOD FOR SELECTIVELY MODULATING THE FLOW OF BLEED AIR USED FOR HIGH PRESSURE TURBINE STAGE COOLING IN A POWER TURBINE ENGINE

BACKGROUND

Technical Field

The present disclosure relates to gas turbine engines and, more particularly, to gas turbine engines that utilize bleed air extraction for high pressure turbine stage cooling.

Description of Related Art

During operation, conventional gas turbine engines constantly flow engine bleed air from the compressor section into and through the nozzle guide vanes and turbine blades for cooling thereof. The cooling flow of bleed air through channels in the nozzle guide vanes and turbine blades permits the vanes and blades to operate at surrounding gas temperatures higher than would otherwise be possible, allowing maximum engine power to be produced. However, the constant extraction of bleed air used for cooling the vanes and blades is detrimental to engine fuel consumption and flight range of the aircraft, which are discussed further herein. Hence, there is a need for an improved method and system for modulating the flow of bleed air used for high pressure turbine stage cooling, which extracts and utilizes the bleed air only on an as required basis.

SUMMARY

In a first aspect, there is a method for selectively modulating bleed air used for cooling a downstream turbine section in a gas turbine engine; the gas turbine engine including a compressor section configured to produce a flow of bleed air, a combustion chamber, and the downstream turbine section configured to receive at least a portion of the bleed air; the method including measuring an engine performance parameter and/or aircraft performance parameter by an engine sensor device and/or an aircraft sensor device; comparing, by a computer processor in an engine control unit, the engine performance parameter and/or the aircraft performance parameter to a performance threshold; determining a bleed trigger condition, if the engine performance parameter and/or the aircraft performance parameter crosses the performance threshold; determining a non-cooling condition, if the engine performance parameter and/or aircraft performance parameter is below the performance threshold; actuating a flow control valve to an open position, in response to the bleed trigger condition, so that bleed air is extracted from the compressor section and flowed to the downstream turbine section; and terminating, in response to the non-cooling condition, the flow of the bleed air to the downstream turbine section of the engine by actuating the flow control valve to a closed position.

In an embodiment, the aircraft performance parameter wherein the engine performance parameter includes at least one of the following: airspeed, outside air temperature (OAT), altitude and rotor speed (Nr).

In yet another embodiment, the engine performance parameter includes at least one of the following: shaft horsepower, measured gas temperature (MGT), torque output, gas generator shaft speed (N1), output shaft speed (N2).

In still another embodiment, the step of determining a bleed trigger condition further includes identifying, by the computer processor, a cooling profile for the downstream turbine section based on the engine performance parameter and/or aircraft performance parameter; wherein the cooling profile determines the amount of bleed air extracted from the compressor section and supplied to the downstream turbine section in the actuating a flow control valve step.

In an embodiment, the cooling profile includes the flow control valve actuated to a fully open position to provide a maximum amount of bleed air to the downstream turbine section.

In another embodiment, the cooling profile includes the flow control valve actuated to a first partially open position to provide a first restricted amount of bleed air to the downstream turbine section.

In an exemplary embodiment, the cooling profile includes the flow control valve actuated to a second partially open position to provide a second restricted amount of bleed air to the downstream turbine section, wherein the second partially open position provides more bleed air to the downstream turbine section than the first partially open position.

In an embodiment, the cooling profile includes the flow control valve to be in the first partially open position for a first amount of time and the second partially open position for a second amount of time, wherein the first amount of time and second amount of time are substantially equal.

In yet another embodiment, the engine control unit is a full authority digital engine control (FADEC).

In still another embodiment, the performance threshold is in a range of from about 40% to about 100% of a maximum measured gas temperature (MGT) for the gas turbine engine.

In an embodiment, the downstream turbine section includes a high pressure turbine section.

In an illustrative embodiment, the high pressure turbine section includes at least one cooled turbine stage adjacent to the combustion chamber.

In a second aspect there is provided a system of selectively modulating bleed air used for cooling a downstream turbine section in a gas turbine engine; the gas turbine engine including the compressor section configured to produce a flow of bleed air, a combustion chamber, and the downstream turbine section configured to receive at least a portion of the bleed air; the system including: an engine sensor device and/or aircraft sensor device for measuring an engine performance parameter and/or an aircraft performance parameter; a computer processor for comparing the engine performance parameter and/or aircraft performance parameter to a performance threshold, and for determining a bleed trigger condition if the engine performance parameter and/or the aircraft performance parameter crosses the performance threshold or determining a non-cooling condition, if the engine performance parameter and/or aircraft performance parameter is below the performance threshold; and a flow control valve configured to restrict the flow of bleed air supplied to the downstream turbine section, the flow control valve being actuatable to an open position upon a determination of a bleed trigger condition and actuatable to a closed position upon determination of a non-cooling condition.

In an embodiment, the aircraft performance parameter wherein the engine performance parameter includes at least one of the following: airspeed, outside air temperature (OAT), altitude and rotor speed (Nr).

In still another embodiment, the engine performance parameter includes at least one of the following: shaft horsepower, measured gas temperature (MGT), torque output, gas generator shaft speed (N1), output shaft speed (N2).

In an exemplary embodiment, the performance threshold is in a range of from about 40% to about 100% of a maximum measured gas temperature (MGT) of the gas turbine engine.

In another embodiment, the computer processor is disposed in an engine control unit.

In an embodiment, the engine control unit is a full authority digital engine control (FADEC).

In yet another embodiment, the downstream turbine section includes a high pressure turbine section.

In an embodiment, the high pressure turbine section includes at least one cooled turbine stage adjacent to the combustion chamber.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of systems and methods for selectively modulating bleed air used for cooling a downstream turbine section in a gas turbine engine are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, apparatuses, etc. described herein may be oriented in any desired direction.

The systems and methods of the present disclosure are configured to improve engine fuel consumption efficiency of a combustion turbine engine through the control of the bleed air extraction used for high pressure turbine stage cooling during different phases of flight. For example, modern gas turbine engines typically cool the high pressure turbine stage using engine bleed airflow extracted continuously from the compressor section during operation (e.g., during takeoff, climb, cruise, decent, and landing). The continuous bleed extraction causes engine performance loss and contributes to increased engine fuel consumption and reduced flight range. The system and method of the present disclosure are configured to control engine bleed air extraction to improve engine fuel consumption and flight range. These and other advantages are further described herein. Certain embodiments of the present disclosure may include some, all, or none of the above advantages. One or more other technical advantages may be readily apparent to those skilled in the art from the figures, descriptions, and claims included herein.

Figure 1:
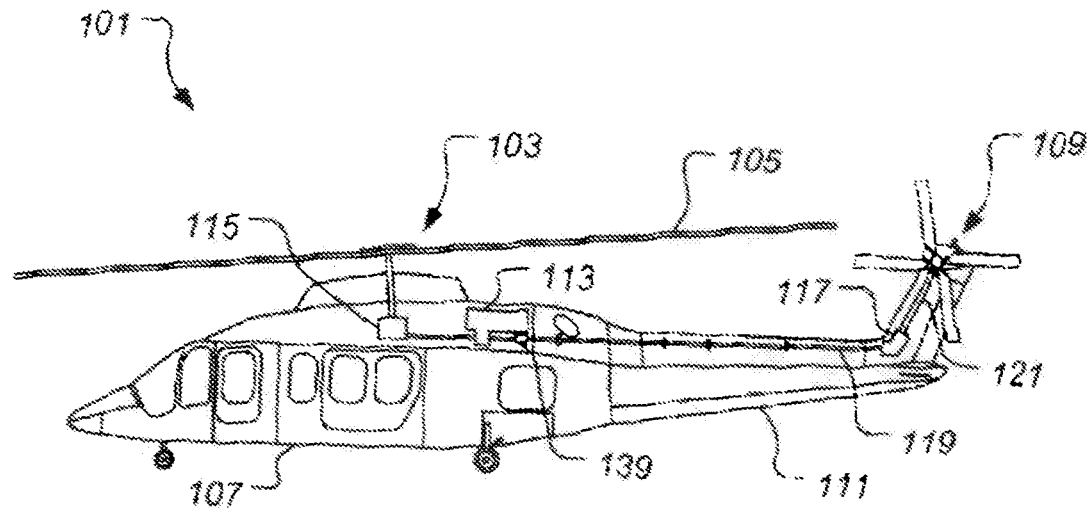
FIG. 1 is a side view of a rotorcraft, according to one example embodiment.

Referring now to FIG. 1 in the drawings, a rotorcraft 101 is illustrated. Rotorcraft 101 has a rotor system 103 with a plurality of rotor Stages 105. The pitch of each rotor Stage 105 can be managed in order to selectively control direction, thrust, and lift of rotorcraft 101. Rotorcraft 101 further includes a fuselage 107, anti-torque system 109, and an empennage 111. Torque is supplied to rotor system 103 and anti-torque system 109 with at least one engine 113. A main rotor gearbox 115 is operably associated with the engine main output driveshaft and the main rotor mast. Further, a reduction speed gearbox 139 and an intermediate gearbox 117 can be operably associated with a tail rotor drive shaft 119 and a tail rotor drive shaft 121.

Figure 2:
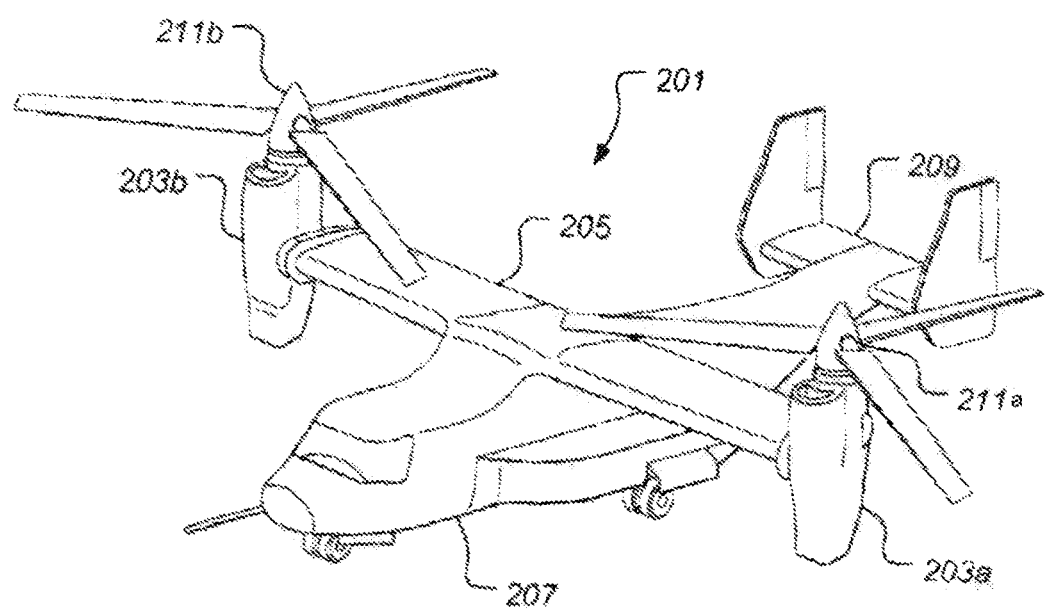
FIG. 2 is a perspective view of a tiltrotor aircraft, according to one example embodiment.

Referring now also to FIG. 2 in the drawings, a tilt rotor aircraft 201 is illustrated. Tilt rotor aircraft 201 can include nacelles 203a and 203b, a wing 205, a fuselage 207, and a tail member 209. Each nacelle 203a and 203b can include an engine and gearbox for driving rotor systems 211a and 211b, respectively. Nacelles 203a and 203b are each configured to rotate between a helicopter mode, in which the nacelles 203a and 203b are approximately vertical, and an airplane mode, in which the nacelles 203a and 203b are approximately horizontal.

Rotorcraft 101 and tilt rotor aircraft 201 are merely illustrative of the wide variety of aircraft and vehicles that are particularly well suited to take advantage of the method and system of the present disclosure. It should be appreciated that other vehicles having a gas turbine engine that utilizes bleed air extraction for high pressure turbine stage cooling can implement the system and method of the present disclosure.

Referring now also to FIGS. 3A-3E in the drawings, a system 301 is schematically illustrated in various embodiments for use with a gas turbine engine 113 of rotorcraft 101. It should be appreciated that gas turbine engine 113 is schematically illustrated and can take on a wide variety of configurations. The system 301 includes an engine sensor device 303, an aircraft sensor device 307, an engine control unit 305 configured to command a bleed air module, and a flow control valve 309. The system 301 can be implemented using an existing engine sensor device 303, an existing aircraft sensor device 307, an existing engine control unit 305 including the bleed air module (e.g., the steps in method 401) having logic to control bleed air used for high pressure turbine cooling in accordance with the embodiments described herein.

The operation of the engine 113 can be selectively controlled by an engine control unit (ECU) 305. In one example embodiment, the engine control unit (ECU) 305 may include digital engine control units, such as a full authority digital engine (or electronics) control (FADEC). ECU 305 may be associated with a variety of valves, actuators, and other devices configured to change the power output and other operational features of engine 113. In some embodiments, the ECU 305 may include equipment configured to convert signals received from input devices (e.g., engine sensor devices 303, aircraft sensor devices 307) into signals recognizable by a FADEC or other engine control equipment.

Engine 113 can include a compressor section 123, a combustion chamber 125, and a downstream turbine section 127. The downstream turbine section includes a high pressure turbine section 128 and low pressure turbine section 129. A combination of compressor section 123 and high pressure turbine section 128 can be referred to as a gas generator. In some embodiments, the compressor section 123 includes a multi-stage compressor having higher pressure at each successive stage.

Air flow (A) is received into an engine air inlet 118 and routed through the compressor section 123. The air flow in the compressor section 123 is directed into an annular manifold 124 and routed into various systems. For example, but not limitation, a secondary conduit 138 routes bleed air into other portions of the aircraft 142 for heating and other airflow applications (e.g., flow of bleed air directed into the wing and tail anti-icing units, air conditioning in the fuselage, etc.). The annular manifold 124 further includes a conventional compressor bleed valve 122 for relieving excess pressure during start-up and in other operational conditions. The annular manifold 124 also provides bleed air to flow into other engine systems; for example, but not limitation into the combustion section 125, as shown in FIG. 3A.

Figure 3A:
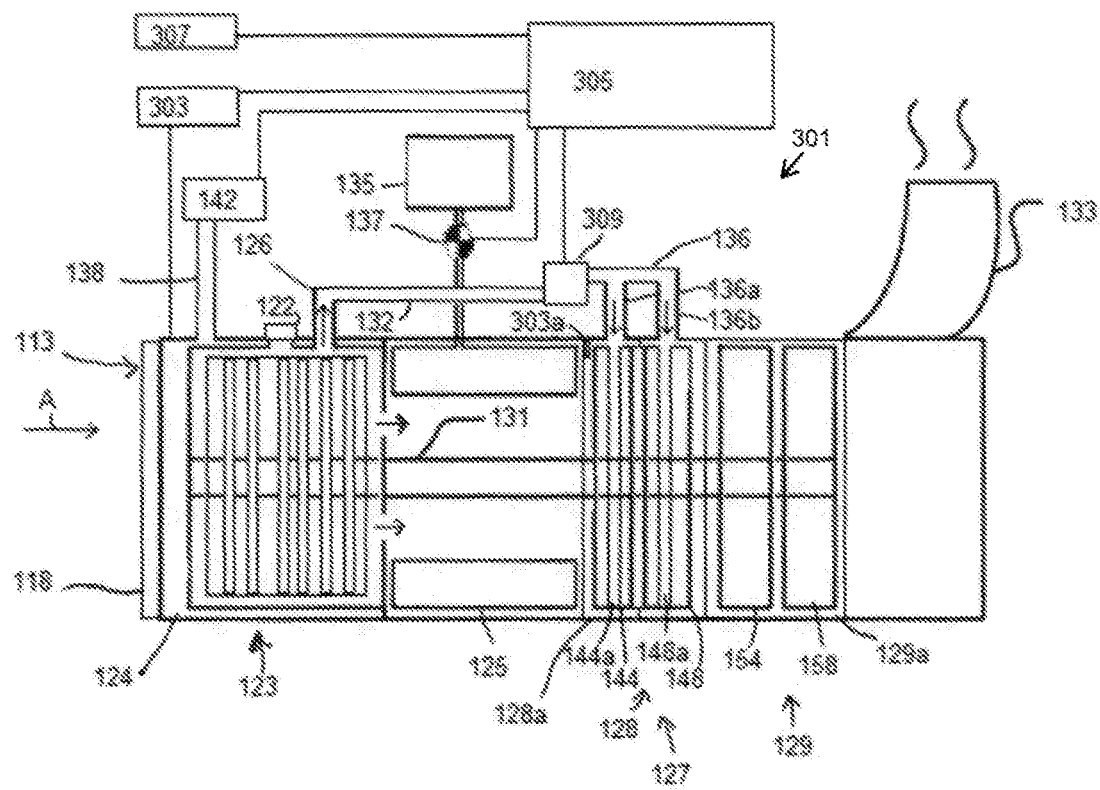
FIG. 3A is a schematic view of a system for selectively modulating the flow of bleed air in a gas turbine engine illustrating a bleed trigger condition (flow control valve actuated to a fully open or partially open position), according to one example embodiment.

In an embodiment shown in FIG. 3A, bleed air flows from the at least one compressor passage 126 through an open flow control valve 309 disposed in main passage 132 and is directed into the downstream turbine section 127. In an embodiment, the at least one compressor passage 126 includes a plurality of compressor conduits to provide a flow of bleed air therein from the annular manifold 124 to the main passage 132 and ultimately to the downstream turbine section 127. The flow control valve 309 is in electrical communication with the ECU 305. The ECU 305 is configured for selectively controlling the position (e.g., open and closed positions) of the flow control valve 309 to modulate the flow of bleed air therethrough. In the embodiment shown in FIGS. 3A-3B, a plurality of main passages 132 feed into the flow control valve 309 disposed at a central point to minimize the number of valves and actuators needed to selectively modulate the flow of bleed air to the downstream turbine section 127.

FIG. 3A schematically illustrates the flow control valve 309 in an open position causing bleed air to be extracted from the compressor section 123 and flowed through the valve 309 and ultimately into the downstream turbine section 127. The open position of the flow control valve 309 can include a fully open position to provide the maximum amount of bleed air to the downstream turbine section 127. The open position of the flow control valve 309 can include a first partially open position to provide a first restricted amount of bleed air to the downstream turbine section 127. The open position of the flow control valve 309 can further include a second partially open position to provide a second restricted amount of bleed air to the downstream turbine section 127. In an embodiment, the second partially open position provides more bleed air to the downstream turbine section 127 as compared to the first partially open position.

Figure 3B:
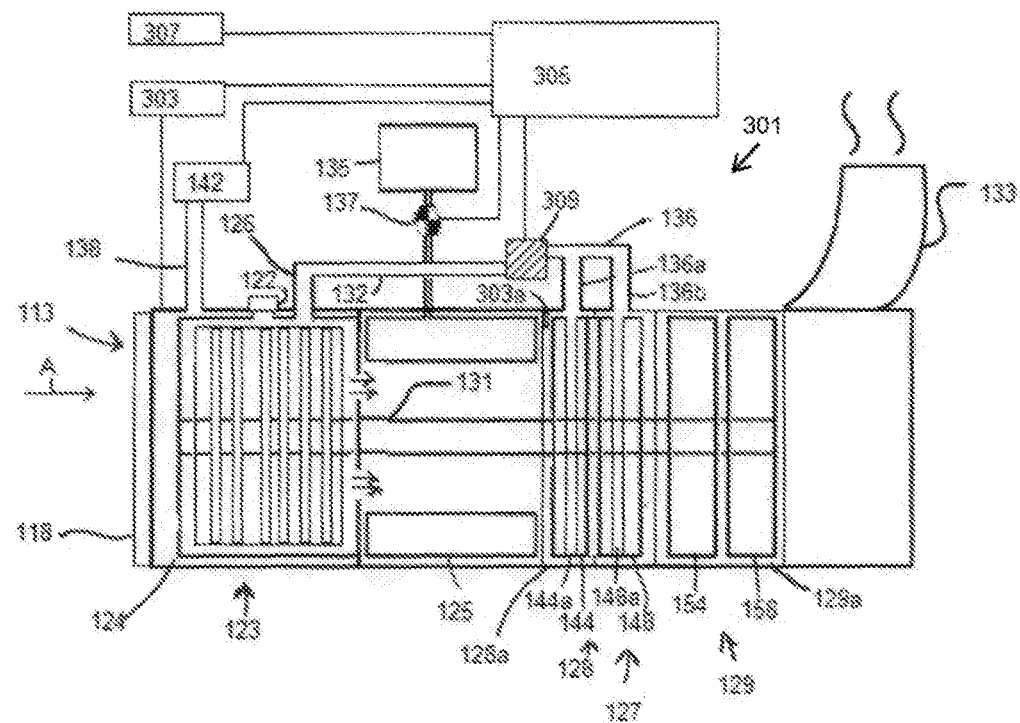
FIG. 3B is a schematic view of the system in FIG. 3A illustrating a non-cooling condition (flow control valve in a closed position), according to an example embodiment.

FIG. 3B schematically illustrates the flow control valve 309 in a closed position such that the flow of bleed air is terminated from the compressor manifold 124 to the downstream turbine section 127. When the flow control valve 309 is in a closed position, the flow of compressed air (e.g., bleed air) is increased through the engine core (as shown by the two sets of double arrows in the engine core in FIG. 3B) as compared to when the flow control valve 309 is in an open position (as shown by two single arrows in the engine core in FIG. 3A). The higher engine core airflow shown in FIG. 3B when the flow control valve 309 is in a closed position improves engine fuel efficiency.

Figure 3C:
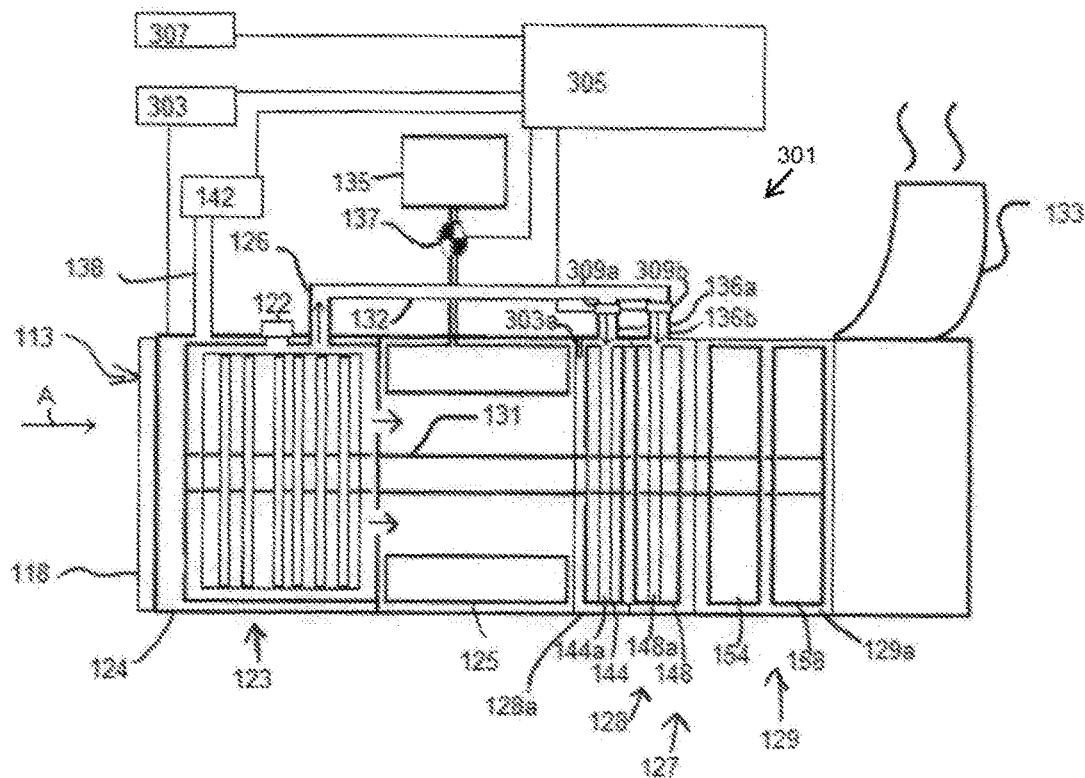
FIGS. 3C-3E are schematic views of alternate embodiments of a system for selectively modulating the flow of bleed air in a gas turbine engine (flow control valve actuated to a fully open or partially open position)

In an illustrative embodiment, as shown in FIG. 3C, the flow control valve 309 comprises a plurality of flow control valves (e.g. a first flow control valve 309a, a second flow control valve 309b,) disposed in respective main passage 132.

The flow control valve 309 is in fluid communication with a high pressure turbine conduit 136 to permit the flow of bleed air into the downstream turbine section 127. In an embodiment, the high pressure turbine conduit 136 can include a plurality of high pressure turbine conduits (e.g., a first high pressure turbine conduit 136a, a second high pressure turbine conduit 136b) that permit the flow of bleed air into the downstream turbine section 127.

In the illustrated embodiment, the downstream turbine section 127 includes a high pressure turbine section 128 and low pressure turbine section 129. The high pressure section 128 is adjacent to the combustion section 125. The hot combustion gases from the combustion section 125 expand as they pass over the stator portion 144 having nozzle guide vanes and into rotor portion 148 having blades thereon. The stator and rotor portions 144, 148 in the first stage are surrounded by a first stage high pressure manifold 128a that receives the flow of bleed air therein and then flows into hollow sections 144a, 148a (hollow sections 144a, 148a are schematically shown) in the stator and rotor portions 144, 148 for cooling thereof during a bleed trigger condition. The stator and rotor portions 144, 148 are referred to as a high pressure stage, a cooled turbine stage, and/or a first stage of the downstream turbine section 127. In an embodiment, the high pressure turbine section 128 comprises at least one cooled turbine stage (e.g., the stator and rotor portion 144, 148) adjacent to the combustion chamber 125. In the embodiment shown in FIGS. 3A-3B, the first and second high pressure turbine conduits 136a, 136b provide a flow of bleed air only into the first stage high pressure manifold 128a.

The low pressure turbine section 129 receives the combustion gases from the first high pressure section 128. The low pressure turbine 129 is adjacent to the high pressure section 128 and includes a stator portion 154 and a rotor portion 158 within a low pressure manifold 129a. In an alternate embodiment shown in FIG. 3E, the low pressure manifold 129a receives bleed air therein during a bleed trigger condition via a conduit 136d in fluid communication with the flow control valve 309.

Figure 3D:
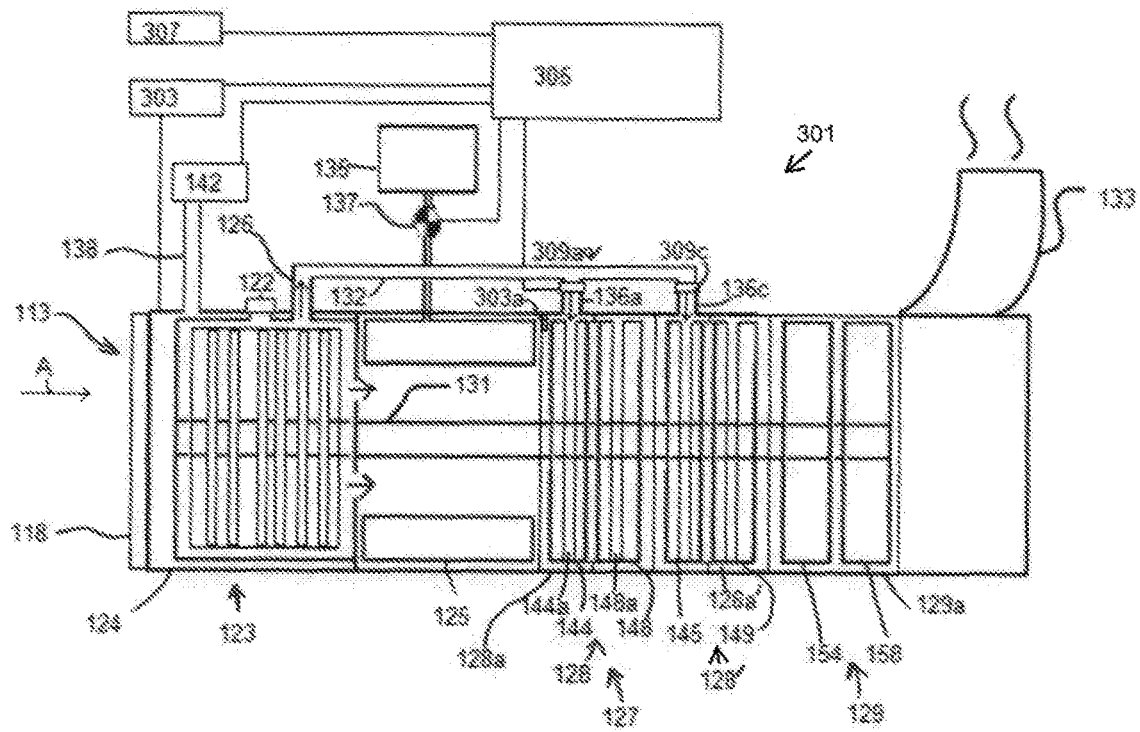
Figure 3E:
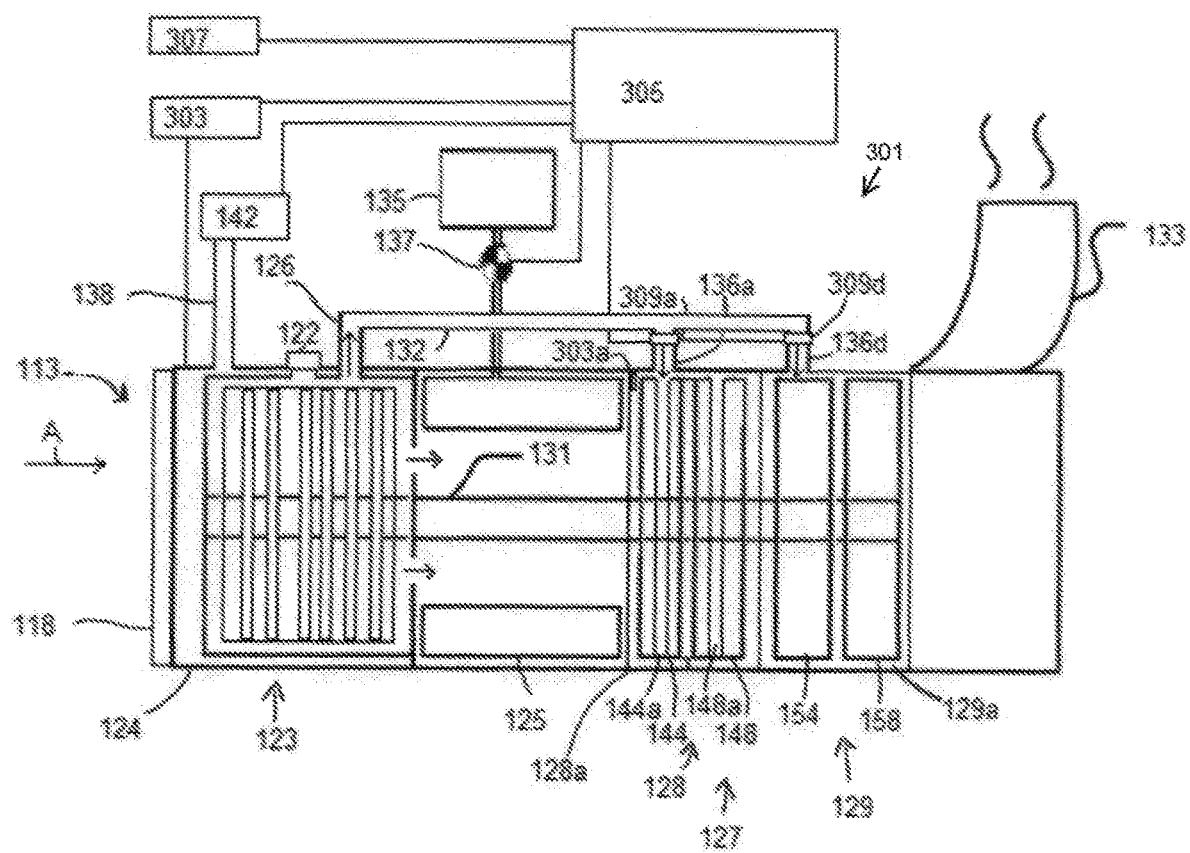

In another embodiment shown in FIG. 3D, the high pressure section 128 includes a first stage 128 and a second stage 128'. The hot combustion gases from the first stage 128 expand further as they pass over a stator portion 145 having nozzle guide vanes and into a rotor portion 149 having rotor blades in the second stage. The stator and rotor portions 145, 149 in the second stage are surrounded by a second high pressure manifold 128a' that receives the flow of bleed air therein and then flows into hollow sections in the stator and rotor portions 145, 149 for cooling thereof during a bleed trigger condition. In the embodiment shown in FIG. 3D, the first and second high pressure turbine conduits 136a, 136b provide a flow of bleed air only into the first and second high pressure manifolds 128a, 128', respectively.

A drive shaft 131 provides torque transfer between compressor section 123 and downstream high pressure turbine section 128. Drive shaft 131 is a schematic representation of a drive shaft suitable for power turbine engine. Drive shaft 131 includes a gas generator shaft and a concentric non-mechanically connected output shaft. An exhaust duct 133 provides for the discharge of hot exhaust gas from engine 113. A fuel supply 135 is configured to provide fuel flow to combustion chamber 125 via a fuel valve 137. Fuel valve 137 can be selectively controlled by a pilot and/or ECU 305 for selectively controlling the output power of engine 113. It should be appreciated that system 301 can be implemented in conjunction with each engine located in the aircraft. For example, an aircraft having two engines can have two systems 301.

System 301 includes an engine sensor device 303 configured to measure, calculate, estimate, and/or transmit information such as an engine performance parameter. The engine performance parameter includes a parameter related to the engine performance. In an embodiment, the engine performance parameter comprises at least one of the following: shaft horsepower, measured gas temperature (MGT), torque output, gas generator shaft speed (N1), output shaft speed (N2). Measured gas temperature (MGT) is an indication of engine limiting temperature and is generally measured downstream of the combustion chamber 125. In some embodiments, the MGT is measured at different locations and identified accordingly. For example, MGT includes at least one of the following: exhaust gas temperature (EGT), interstage turbine temperature (ITT), turbine inlet temperature (TIT), high pressure turbine inlet temperature (T4), turbine outlet temperature (TOT), turbine gas temperature (TGT).

System 301 includes an aircraft sensor device 307 configured to measure, calculate, estimate, and/or transmit information such as an aircraft performance parameter. The aircraft performance parameter includes a parameter related to the aircraft performance and/or aircraft flight conditions. In an embodiment, the aircraft performance parameter comprises at least one of the following: airspeed, outside air temperature (OAT), altitude and rotor speed (Nr).

According to illustrative embodiments, some engine and/or aircraft performance parameters can be used to determine the current bleed flow requirement used for cooling the high pressure section 128 (i.e., MGT, SHP). Other engine and/or aircraft performance parameters (N1, N2, airspeed, OAT, altitude, Nr) can be used to determine anticipatory bleed flow and identify a desired cooling profile (i.e., the performance parameters could be used to anticipate near term flight conditions and modulate the bleed airflow for cooling the anticipated bleed trigger condition).

An engine sensor device 303 can be any variety of suitable sensors capable of measuring an engine performance parameter. In an exemplary embodiment, the engine sensor device 303 can provide engine performance parameters; for example, but not limitation, temperatures and/or rotational speed of high pressure turbine section 128. The engine sensor device 303 is in data communication with the ECU 305. ECU 305 is configured for actively comparing an engine performance parameter with a performance threshold.

An aircraft sensor device 307 can be any variety of suitable sensors capable of measuring an aircraft performance parameter. In an exemplary embodiment, the aircraft sensor device 307 can provide aircraft performance parameters; for example, but not limitation, airspeed, OAT, altitude and rotor speed. The aircraft sensor device 307 is in data communication with the ECU 305. ECU 305 is configured for actively comparing an aircraft performance parameter with a performance threshold.

In an embodiment, system 301 is configured to determine if the engine performance parameter and/or aircraft performance parameter crosses the performance threshold (e.g., greater than or equal to a value of the performance threshold) or lower than the performance threshold (e.g., lower than a value of the performance threshold). If the engine performance parameter and/or aircraft performance parameter crosses the performance threshold (e.g., during high horsepower conditions like take-off, hover, landing of an aircraft when cooling is needed in the high pressure turbine section 128), then a command is sent from ECU 305 to flow control valve 309 to an open position to permit the flow of bleed air into the high pressure turbine section 128.

If the engine performance parameter and/or aircraft performance parameter is below a performance threshold (e.g., during a low horsepower condition for example, but not limitation, during cruise or decent), then a non-cooling condition is determined by the ECU 305. If a non-cooling condition is determined by the ECU 305, in an embodiment, a command is sent from the ECU 305 to flow control valve 309 to terminate the flow of bleed air to the downstream turbine section 127. In an embodiment, during a non-cooling condition, the flow of bleed air is terminated only to the high pressure turbine section 128.

In some embodiments, the performance threshold is a range of values. Accordingly, the system 301 is configured to determine if the engine performance parameter and/or aircraft performance parameter is within the range of the performance threshold (e.g., within the numerical range of the performance value) or outside of the range of the performance threshold (e.g., not within the numerical range of the performance value). If the engine performance parameter and/or aircraft performance parameter is within the range of the performance threshold (e.g., during high horsepower conditions like take-off, hover, landing of an aircraft when cooling is needed in the high pressure turbine section 128), then a command is sent from ECU 305 to flow control valve 309 to an open position to permit the flow of bleed air into the high pressure turbine section 128. If the engine performance parameter and/or aircraft performance parameter is outside of the range of the performance threshold (e.g., during a low horsepower condition), then a non-cooling condition is determined by the ECU 305. If a non-cooling condition is determined by the ECU 305, in an embodiment, a command is sent from the ECU 305 to flow control valve 309 to terminate the flow of bleed air to the downstream turbine section 127. In an embodiment, during a non-cooling condition, the flow of bleed air is terminated only to the high pressure turbine section 128. For example, but not limitation, in a prophetic example, as shown in FIGS. 5C-5D and 6A-6B, the performance threshold is a range of from a maximum continuous power (MCP) for engine 113 to about 60% of the MCP.

In an embodiment, the ECU 305 can include a cooling profile module for determining the amount of bleed air extracted from the compressor section 123 and supplied to the downstream turbine section 127. In some embodiments, the cooling profile module functions to identify the cooling profile by comparing the engine and/or aircraft performance parameters to their respective performance thresholds and/or accessing data in a preprogrammed database. In an embodiment, the preprogrammed database includes preprogrammed cooling profiles for a particular aircraft and/or engine.

Figure 4A:
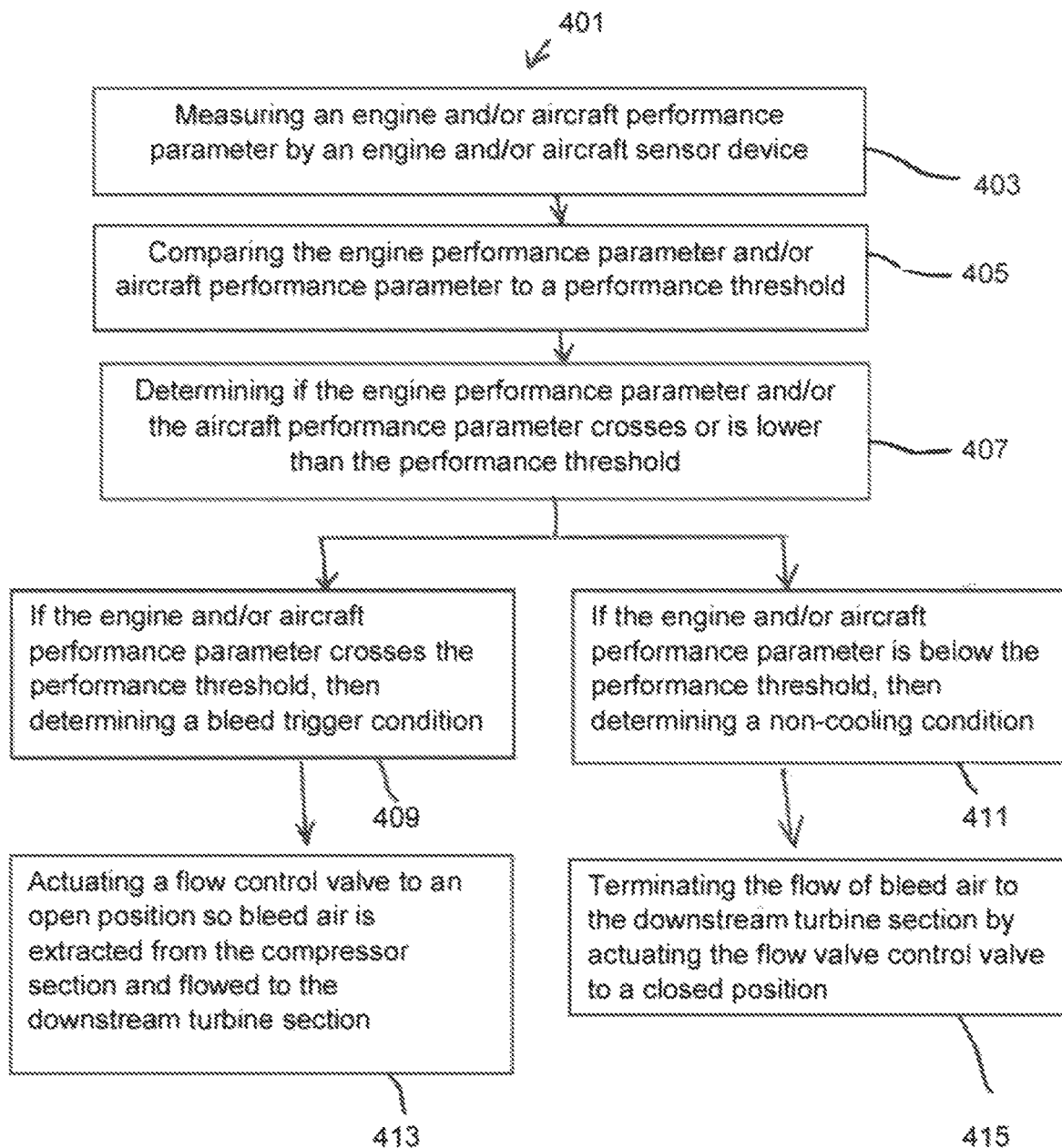
FIG. 4A is a schematic view of a method for selectively modulating bleed air in a gas turbine engine, according to one example embodiment.
Figure 4B:
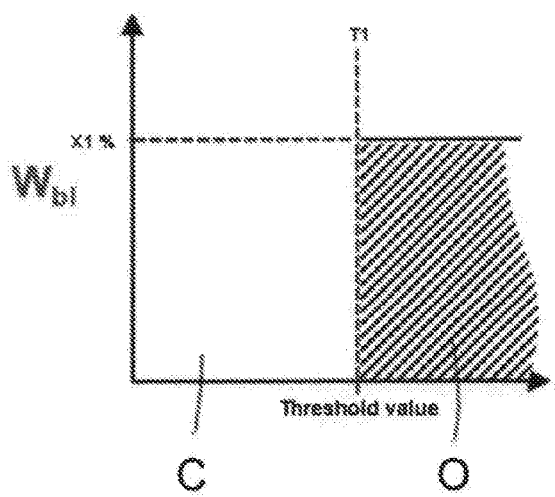
FIGS. 4B-4D are graphical representations of illustrative embodiments of cooling profiles used for selectively modulating the flow of bleed air in a gas turbine engine.
Figure 4C:
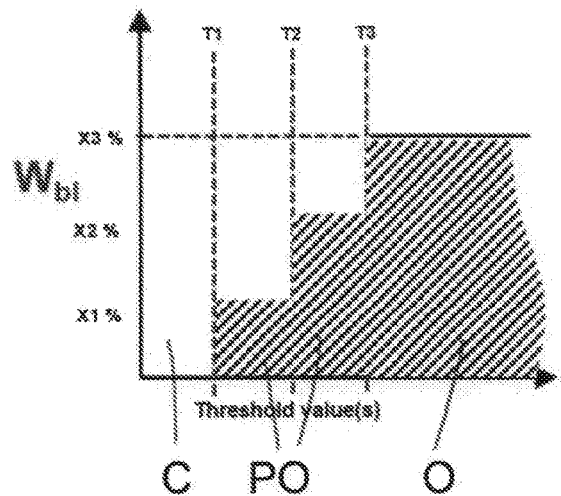
Figure 4D:
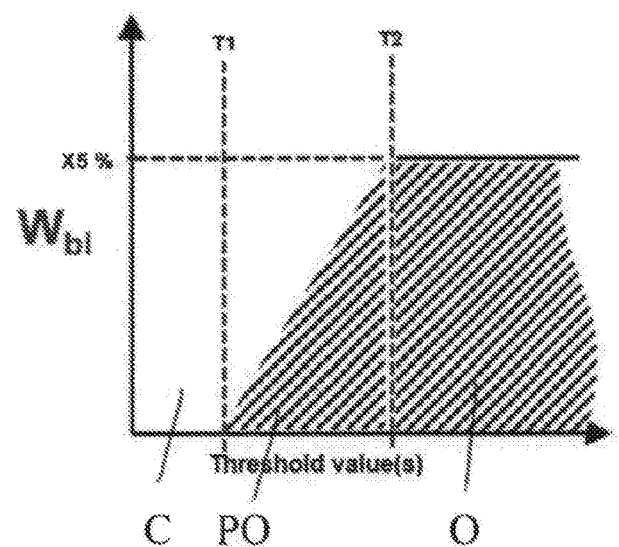

Illustrative embodiments of identified cooling profiles are shown in FIGS. 4B-4D. In an illustrative example shown in FIG. 4B, the non-cooling condition occurs and the flow control valve 309 is in a closed position until a performance threshold T1 triggers the actuation of the flow control valve 309 to a fully open position to achieve a maximum bleed air flow of X1% cooling profile.

FIG. 4C is another illustrative example, the flow control valve 309 is in a closed position until a first performance threshold T1 and sequentially a second performance threshold T2 trigger the actuation of the flow control valve 309 to a first and second partially open position having a first air flow and a second airflow X1%, X2%, respectively. Ultimately, the illustrative example in FIG. 4C leads to a third performance threshold T3 that triggers the actuation of the flow control valve 309 to a fully open position to achieve a maximum bleed air flow of X3%. In an embodiment, the bleed trigger conditions at T1, T2, T3 and resulting valve open positions and bleed flow therethrough are identified as a multiple discrete cooling profile.

In yet another illustrate example in FIG. 4D, the flow control valve 309 is in a closed position until a first performance threshold T1 triggers the actuation of the flow control valve 309 to a first open position which gradual increases over time to a fully open position at a second performance threshold T2 is crossed, which triggers the actuation of the flow control valve 309 to a fully open position. In an embodiment, the cooling profile as shown in FIG. 4D is a continuously scheduled cooling profile.

In an illustrative embodiment, the performance threshold is from about 40% to about 100% of a maximum measured gas temperature (MGT) for the gas turbine engine (e.g., 40%, 50%, 60%, 70%, 80%, 90%). It would be understood by those skilled in the art that the actual performance threshold would be determined by the type, size and other specifications of the aircraft and engine(s) as well as aircraft operating conditions and requirements. It should be appreciated that the exact performance threshold is implementation specific. Further, several different performance thresholds can be used depending on the operational situation of the aircraft (e.g., MGT, SHP, OAT, N1, N2, OAT, Nr, etc.).

In an embodiment, system 301 is configured such that when a non-cooling condition is determined, a command from the ECU 305 is sent to the fuel valve 137 to restrict fuel flow to the combustion chamber 125 to provide enough fuel for engine 113 to operate but also reducing the amount of fuel to improve fuel efficiency during the non-cooling condition.

Referring now to FIG. 4A, a method 401 is configured for selectively modulating the flow of bleed air in a gas turbine engine by an engine control unit. Method 401 can include the step 403 of measuring an engine performance parameter and/or aircraft performance parameter by an engine sensor device and/or aircraft sensor device. Step 403 can be implemented by using an engine sensor device 303 and/or aircraft sensor device 307 described further herein with regard to system 301.

Method 401 can include the step 405 of comparing, by a computer processor in the engine control unit, the engine performance parameter and/or aircraft performance parameter to a performance threshold.

Method 401 can include the step 407 of determining if the engine performance parameter and/or aircraft performance parameter crosses (equal to or greater than) or is lower than the performance threshold. If the engine performance parameter and/or aircraft performance parameter crosses the performance threshold (e.g., during high horsepower conditions like take-off, hover, landing of an aircraft), then it is determined that a bleed trigger condition does exist in step 409 and a command is sent from ECU 305 to flow control valve 309 to actuate to an open position in step 413 such that the valve(s) 309 is open to permit extraction of bleed air from the compressor section 123 to the downstream turbine section 127, which is in some embodiments the high pressure turbine section 128.

If the engine performance parameter and/or aircraft performance parameter is less than the performance threshold (e.g., during a low horsepower condition), then a non-cooling condition is determined in step 411 by the ECU 305. In an embodiment, if a non-cooling condition is determined, the flow of bleed air is terminated in step 415 (e.g. the flow control valve 309 is actuated to a closed position) until the non-cooling condition is no longer determined by the ECU

305. If a non-cooling condition is determined, the flow of bleed air is terminated to the high pressure turbine section 128.

Figure 7:
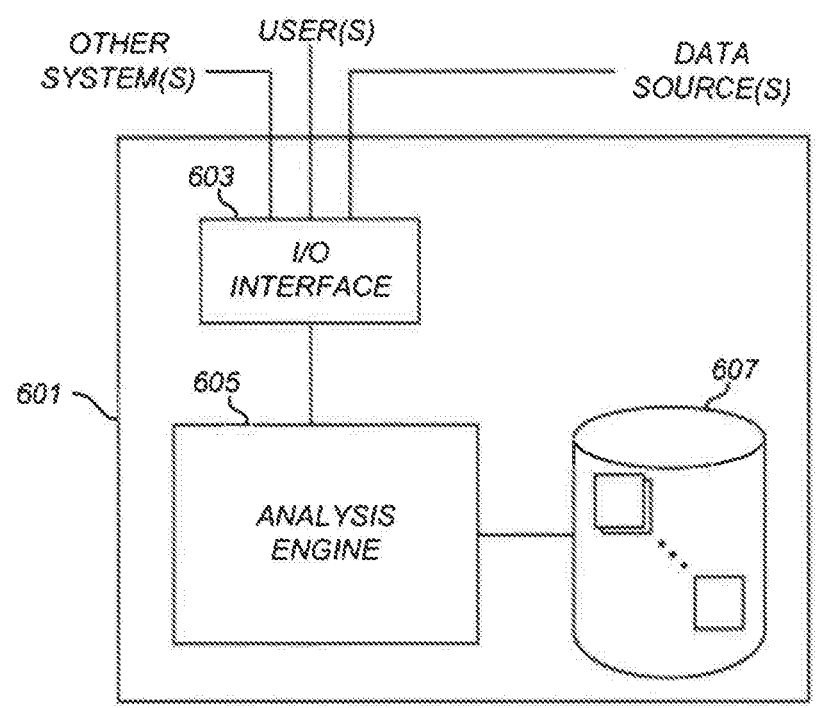
FIG. 7 is a schematic view of an engine control unit, according to one example embodiment.

Referring now also to FIG. 7, an engine control unit is schematically illustrated as a computer system 601. A computer system 601 is configured for performing one or more functions with regard to the operation of system 301 and method 401, further disclosed herein. Further, any processing and analysis can be partly or fully performed by computer system 601. Computer system 601 can be partly or fully integrated with other aircraft computer systems.

The system 601 can include an input/output (I/O) interface 603, an analysis engine 605, and a database 607. Alternative embodiments can combine or distribute the input/output (I/O) interface 603, analysis engine 605, and database 607, as desired. Embodiments of the system 601 can include one or more computers that include one or more computer processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 603 can provide a communication link between external users, systems, and data sources and components of the system 601. The I/O interface 603 can be configured for allowing one or more users to input information to the system 601 via any known input device. Examples can include a keyboard, mouse, touch screen, and/or any other desired input device. The I/O interface 603 can be configured for allowing one or more users to receive information output from the system 601 via any known output device. Examples can include a display monitor, a printer, cockpit display, and/or any other desired output device. The I/O interface 603 can be configured for allowing other systems to communicate with the system 601. For example, the I/O interface 603 can allow one or more remote computer(s) to access information, input information, and/or remotely instruct the system 601 to perform one or more of the tasks described herein. The I/O interface 603 can be configured for allowing communication with one or more remote data sources. For example, the I/O interface 603 can allow one or more remote data source(s) to access information, input information, and/or remotely instruct the system 601 to perform one or more of the tasks described herein.

The database 607 provides persistent data storage for system 601; for example, for storing data including a performance threshold that can be used to determine a bleed trigger condition and a non-cooling condition and cooling profiles. While the term "database" is primarily used, a memory or other suitable data storage arrangement may provide the functionality of the database 607. In alternative embodiments, the database 607 can be integral to or separate from the system 601 and can operate on one or more computers. The database 607 preferably provides non-volatile data storage for any information suitable to support the operation of system 301 and method 401, including various types of data discussed further herein.

The analysis engine 605 can be configured for comparing an engine performance parameter and/or aircraft performance parameter to a performance threshold and determining if the engine performance parameter and/or aircraft performance parameter is greater, equal to, or less than the performance threshold. Further, analysis engine can be in lieu of engine control unit 305, or integrated therewith. The analysis engine 605 can include various combinations of one or more processors, memories, and software components.

Figure 5A:
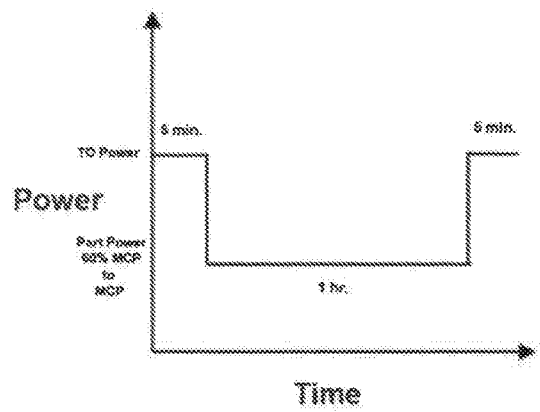
FIGS. 5A-5B are graphical representations of power generated by a gas turbine during a conventional mission and the associated continuous flow of bleed air directed to cooling the high pressure turbine stage during the entire mission.
Figure 5B:
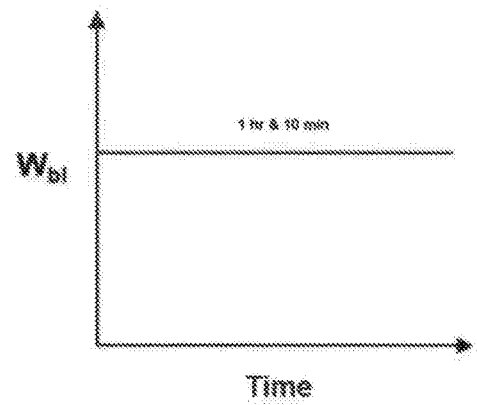

System 301 and method 401 provide significant advantages over conventional turbine engines. For example, FIGS. 5A-5B represent an exemplary conventional helicopter mission operating at a high power (an amount greater than maximum continuous power during take-off conditions (the first 5 minutes of mission) and landing conditions (final 5 minutes of the mission). The cruise portion of the exemplary mission is about 1 hour and the gas turbine engine operates at about maximum continuous power to about sixty percent of MCP. During the high power (take-off and landing conditions) and low power (cruise portion) as shown in FIG. 5B, the bleed air flow rate $W_{b1}$ from the compressor portion of the engine into the high pressure turbine section of the engine remains constant through the take-off, cruise, and landing conditions (e.g., the bleed air flows into the high pressure turbine section for the complete 1 hour and 10 minute flight time).

In contrast, in prophetic examples of the system 301 and method 401, as shown in FIGS. 5C, 5D, and 6A-6B, the flow of bleed air is terminated when the non-cooling condition is determined by the engine control unit as described herein. In an example, shown in FIG. 5C, the flow of bleed air is maintained during take-off and landing and terminated once the engine performance parameter and/or aircraft performance parameter is equal to or lower than the performance threshold (e.g., during a bleed trigger condition). Once the engine power is reduced to maximum continuous power (e.g., after the first 5 minutes), a command is sent from the ECU to the respective flow control valve to terminate the flow of bleed air to the high pressure turbine section. Once the engine increases power above the maximum continuous power (e.g., at the last five minutes), in response to a bleed trigger condition, the ECU commands the respective flow control valve to open to permit the flow of bleed air to the high pressure turbine section during the landing condition.

Figure 5C:
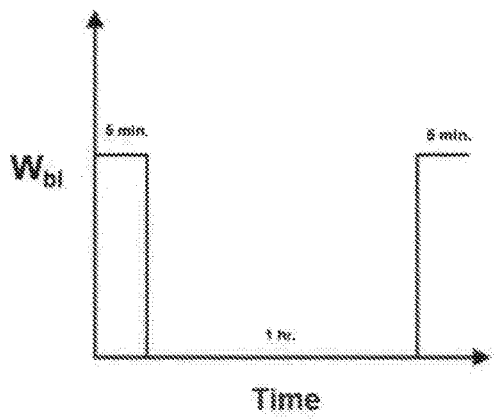
FIG. 5C is a graphical representation of an embodiment for selectively modulating the flow of bleed air used for cooling the high pressure turbine stage in a gas turbine engine during a conventional mission, according to an illustrative embodiment.
Figure 5D:
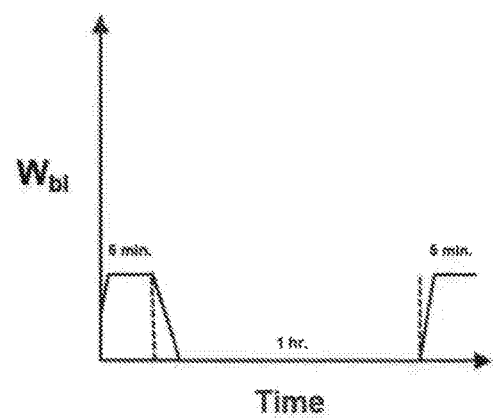
FIG. 5D is another graphical representation of another embodiment for selectively modulating the flow of bleed air used for cooling the high pressure turbine stage in a gas turbine engine during a conventional mission, according to an exemplary embodiment.

In another illustrative example, shown in FIG. 5D, the flow of bleed air is maintained during take-off and landing (e.g., the first and last five minutes of the mission). Once the engine performance parameter and/or aircraft performance parameter is equal to or lower than the performance threshold, the flow of bleed air is tapered and following continuously scheduled cooling profiles and then terminated during the non-cooling condition. More particularly, once the engine power is reduced to maximum continuous power, a command is sent from the ECU to the respective valve to gradually restrict the flow of bleed air to the high pressure turbine section and ultimately terminate the flow of bleed air thereto. Once the engine increases power above the maximum continuous power, in response to a bleed trigger condition, the ECU commands the respective flow control valve to gradually open and to fully open to permit the flow of bleed air to the high pressure turbine section during the landing condition (e.g., the last five minutes of the mission).

Figure 6A:
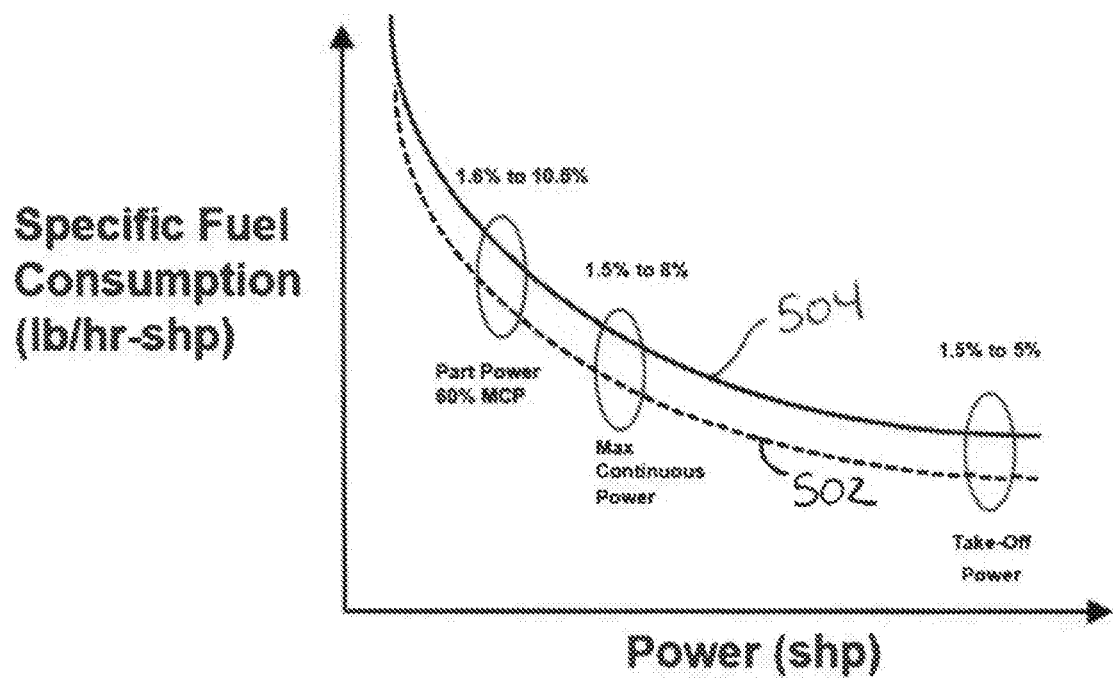
FIGS. 6A-6B are prophetic graphical representations of engine fuel consumption using a conventional continuous bleed extraction as compared to a system and/or method for selectively modulating the flow of bleed air to the high pressure stage in a gas engine, according to an illustrative embodiment.

Advantageously, the illustrative embodiments in FIGS. 5C and 5D can reduce specific fuel consumption per cooled turbine stage depending upon engine power and environmental operating conditions as shown in FIG. 6A. The dashed line 502 represents the fuel used by an engine with modulating the flow of bleed air to the high pressure turbine Stage section while the solid line 504 represents the conventional engine (constant flow of bleed air to the high pressure turbine Stage section of the engine). As shown, as the power is reduced during the non-cooling conditions (e.g., when the performance threshold is 60% of the maximum continuous power) and the flow of bleed air is restricted and terminated, the specific fuel consumption is reduced by 1.5% to 10.5% per cooled turbine stage depending upon engine power and environmental operating conditions. In another example, as the power is reduced during the non-cooling conditions (e.g., when the performance threshold is maximum continuous power) and the flow of bleed air is restricted and terminated, the specific fuel consumption is reduced by 1.5% to 8% per cooled turbine stage depending upon engine power and environmental operating conditions. In some embodiments, reducing the flow of bleed air during the take-off and landing conditions can reduce specific fuel consumption from 1.5% to 5% per cooled turbine stage depending upon engine power and environmental operating conditions.

Figure 6B:
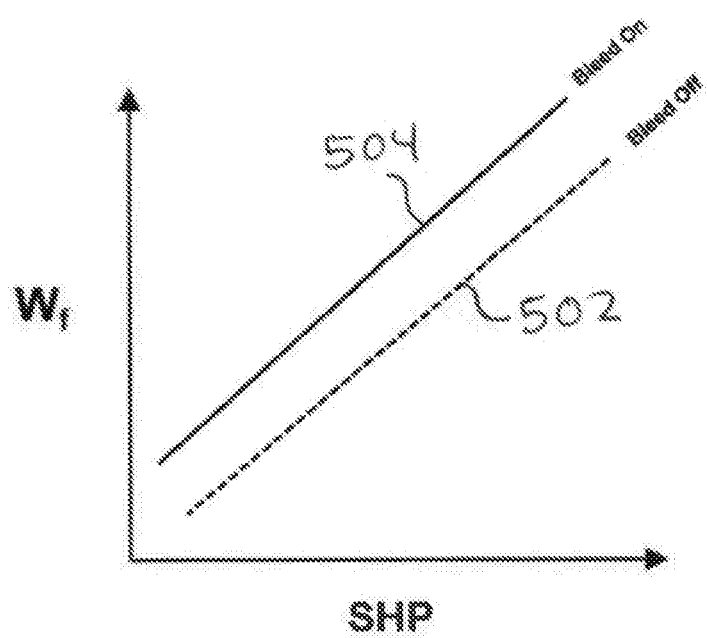

Moreover, FIG. 6B is a further graphical representation of a fuel flow rate $W_f$ being greater in the conventional engine using continuous flow of bleed air 504 as compared to a fuel flow rate $W_f$ of the modulated flow of bleed air 502 to the high pressure turbine section of the engine as described herein with regard to system 301 and method 401. Furthermore, the system 301 and method 401 of the present disclosure can improve the flight range of an aircraft because fuel efficiency has been improved.

It may be advantageous to set forth definitions of certain words and phrases used in this patent document.

The terms "a" and "an" are defined as one or more unless this disclosure explicitly requires otherwise.

The term "substantially" is defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Any numerical range defined by two R numbers as defined in the above is also specifically disclosed and includes the two R numbers.

Use of broader terms such as comprises, includes, and has (and any derivatives of such terms, such as comprising, including, and having) should be understood to provide support for narrower terms, such as consisting of, consisting essentially of, and comprised substantially of. Thus, in any of the claims, the term "consisting of," "consisting essentially of," or "comprised substantially of" can be substituted for any of the open-ended linking verbs recited above in order to change the scope of a given claim from what it would otherwise be using the open-ended linking verb.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. The feature or features of one embodiment may be applied to other embodiments to achieve still other embodiments, even though not described, unless expressly prohibited by this disclosure or the nature of the embodiments. The scope of protection is not limited by the description set out above but is defined by the claims that follow, the scope including all equivalents of the subject matter of the claims. Each and every claim is incorporated as further disclosure into the specification and the claims are embodiment(s) of the present invention.

What is claimed is:

1. A method for selectively modulating bleed air used for cooling a downstream turbine section in a gas turbine engine; the gas turbine engine comprising a compressor section configured to produce a flow of bleed air, a combustion chamber, and the downstream turbine section configured to receive at least a portion of the bleed air; the method comprising:

measuring an engine performance parameter and/or aircraft performance parameter by an engine sensor device and/or an aircraft sensor device;

comparing, by a computer processor in an engine control unit, the engine performance parameter and/or the aircraft performance parameter to a performance threshold;

determining a bleed trigger condition, when the engine performance parameter and/or the aircraft performance parameter crosses the performance threshold;

determining a non-cooling condition, when the engine performance parameter and/or aircraft performance parameter is below the performance threshold;

actuating a flow control valve to an open position, in response to the bleed trigger condition, so that the bleed air is extracted from the compressor section and flowed to the downstream turbine section;

terminating, in response to the non-cooling condition, the flow of the bleed air to the downstream turbine section of the engine by actuating the flow control valve to a closed position;

identifying, by the computer processor, a cooling profile for the downstream turbine section based on the engine performance parameter and/or aircraft performance parameter;

wherein the cooling profile determines an amount of bleed air extracted from the compressor section and supplied to the downstream turbine section in the actuating a flow control valve step; the cooling profile includes the flow control valve actuated to a fully open position to provide a maximum amount of bleed air to the downstream turbine section; the cooling profile includes the flow control valve to be in the first partially open position for a first amount of time and the second partially open position for a second amount of time, wherein the first amount of time and second amount of time are substantially equal.

2. The system according to claim 1, wherein the aircraft performance parameter comprises at least one of the following: airspeed, outside air temperature (OAT), altitude and rotor speed (Nr).

3. The system according to claim 1, wherein the engine performance parameter comprises at least one of the following: shaft horsepower, measured gas temperature (MGT), torque output, gas generator shaft speed (N1), output shaft speed (N2).

4. The method according to claim 1, wherein the downstream turbine section comprises a high pressure turbine section and a low pressure turbine section,
    wherein when the non-cooling condition is determined, the flow of bleed air is terminated only to the high pressure turbine section.

\* \* \* \* \*